Aug. 1, 1961                H. I. FLOMENHOFT                2,994,496
SHOCK-ABSORBER ASSEMBLY FOR AIRPLANE ARRESTING HOOKS
Filed Aug. 5, 1958                                    2 Sheets-Sheet 1
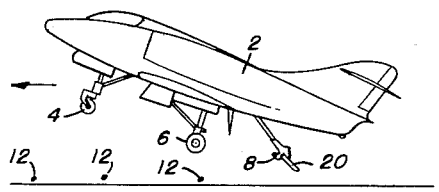
FIG. 1
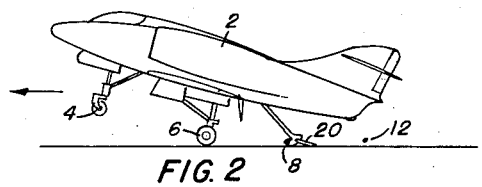
FIG. 2
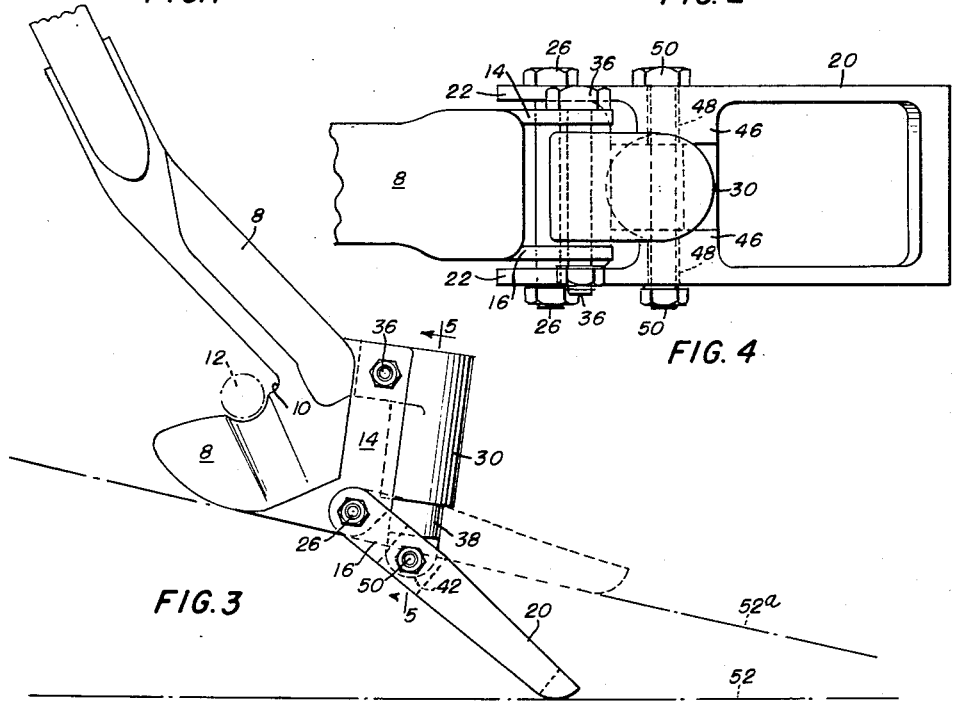
INVENTOR
HUBERT I. FLOMENHOFT
BY Fisher, Christen & Goodson
ATTORNEYS Aug. 1, 1961 H. I. FLOMENHOFT 2,994,496
SHOCK-ABSORBER ASSEMBLY FOR AIRPLANE ARRESTING HOOKS
Filed Aug. 5, 1958 2 Sheets-Sheet 2

INVENTOR
HUBERT I. FLOMENHOFT

ATTORNEYS

# United States Patent Office 2,994,496
Patented Aug. 1, 1961

2,994,496
SHOCK-ABSORBER ASSEMBLY FOR AIRPLANE ARRESTING HOOKS
Hubert I. Flomenhoft, Columbus, Ohio, assignor to McLean Development Laboratories, Inc., Long Island City, N.Y., a corporation of Texas
Filed Aug. 5, 1958, Ser. No. 753,371
5 Claims. (Cl. 244—110)

Airplanes, especially those jet propelled, have a high landing speed, and when the plane approaches the deck at a steep angle, the cable-engaging hook carried by the plane is apt to hit the deck rather hard, with resulting "hook bounce" and possible skipping of one or more of the usual transverse arresting cables and with possible damage to the hook assembly and to the deck. The term "deck" as used herein means a landing surface, such as the deck of a carrier, or the surface of a landing field.

The present invention is an improved shock-absorber assembly for airplane arresting hooks, for absorbing the initial shock when the hook hits the deck, thereby lessening or avoiding "hook bounce."

The improvement of the present invention comprises in combination with the usual arresting hook for engagement with one or more of the usual arresting cables, of a feeler skid, pivoted to the hook, to the rear of the hook and extending downwardly a substantial distance below the lowermost part of the hook. A shock absorber, also attached to the hook or built integral therewith, is operatively connected with the feeler skid; the skid hits the deck before the hook hits the deck and transmits the shock of impact to the absorber and so prevents violent impact of the hook with the deck, especially if the plane is coming in at a steep angle. This avoids possible "hook bounce" and possible damage to the arresting hook.

This invention will be described in more detail in connection with the accompanying drawings, wherein:

FIG. 1 is a diagrammatic view of an arplane provided with the arresting-hook shock-absorber assembly of the present invention, just before landing;

FIG. 2 is a similar view of the plane as it hits the deck;

FIG. 3 is a side view, on an enlarged scale, of the arresting-hook shock-absorber assembly of the present invention;

FIG. 4 is a plan view of FIG. 3, enlarged;

FIG. 5 is a vertical section of line 5—5 of FIG. 3; and

Figure 6:
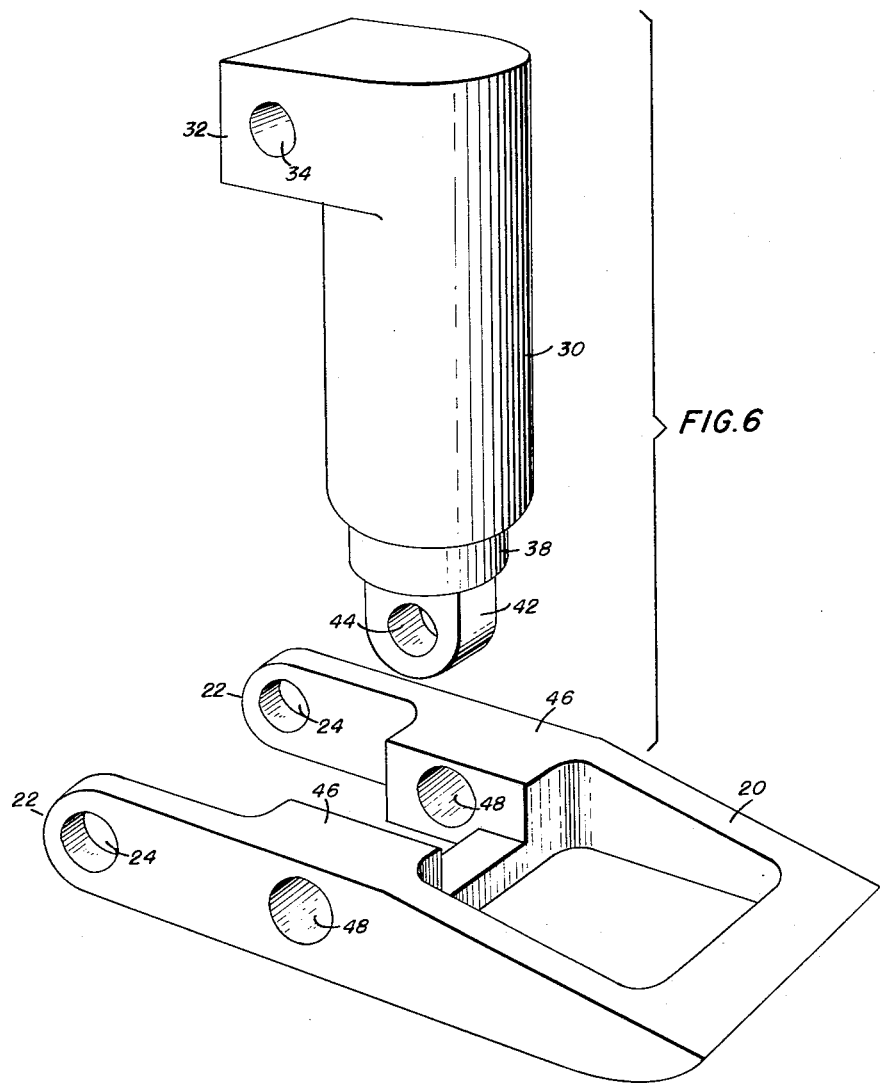
FIG. 6 is an enlarged exploded perspective of the skid and shock absorber.

Referring now to these drawings, 2 is a known type of airplane, having the usual retractable nose landing wheels 4 and body landing wheels 6. Although a nose-wheel type airplane is shown, the present invention is equally applicable to tail-wheel type airplanes which are provided with arresting hooks. Aft of the wheels 6, the plane is provided with a landing hook 8, the bight portion 10 of which is adapted to engage one or more of the usual transverse arresting cables 12 on the deck of the carrier or on a landing field provided with transverse arresting cables.

The hook 8, as shown in FIG. 4, is provided with a bracket indicated generally at 14. This may comprise a pair of vertical side plates 16 welded or otherwise secured to opposite sides of the hook or may be an integral part of the basic hook assembly.

The feeler skid 20 comprises a pair of forwardly projecting arms 22 apertured at 24 to receive a pivot bolt 26 for pivoting it to plates 16 of bracket 14.

A shock-absorber cylinder 30 is provided at its upper end with a bearing portion 32, FIG. 6, apertured at 34; a pivot bolt 36 passing through side plates 16 of bracket 14 and apertures 24 on the skid 20 mounts the cylinder 30, so that it has a slight pivotal movement about bolt 36.

The shock-absorber cylinder 30, of any desired type, conveniently hydraulic, is provided with a piston 38 and a return means, which may be compressed air, compressed fluid, or a mechanical compression spring 40. The shock absorber 30 is of the slow return type, so that after it moves upwardly by contact with the landing surface, the oil return flow is restricted, whereby the hook 8 is not lifted too quickly, so that there is sufficient time to pick up the arresting cable. The vertical and horizontal passages 39 through the upper part of piston 38 allow fluid flow therethrough in either direction, at a rate depending on the size of these passages and the viscosity of the fluid used. Piston 38 has a downward extension 42 apertured at 44. The feeler skid 20 is provided with bearing portions 46 aperture at 48. Apertures 44 and 48 are brought into registry and a through bolt 50 attaches the skid 20 to shock absorber 30.

In operation, when the plane is coming in for a landing, as in FIG. 1, the skid 20 first hits the deck or landing field 52, as in FIG. 3. The impact moves the skid upwardly, the shock being absorbed in whole or in part by shock absorber 30. At about the same time, hook 8 hits the deck or landing surface, as at 52a, with greatly lessened force, thereby lessening or avoiding "hook bounce" and facilitating engagement with the first arresting cable that is then encountered.

While the present preferred embodiment of the invention has been described in some detail, it should be understood that the inventive concept may be carried out in other ways.

I claim as my invention:

1. A shock-absorber assembly for airplanes arresting hook, comprising a skid pivoted to said hook and projecting a substantial distance below and rearwardly with respect to said hook, a shock absorber mounted on said hook and operatively connected to said skid, for resisting upward movement thereof, whereby the skid hits the landing surface before the hook hits such surface, said shock absorber absorbing the impact and preventing violent impact of the hook with the landing surface.

2. A shock-absorber assembly for airplane arresting hooks, comprising an arresting hook carried by the airplane and adapted to engage a transverse arresting cable on the deck of an aircraft carrier or on a landing field, a skid mounting bracket secured to or constructed integral with the lower part of said hook, just aft of the hook, a skid pivoted to the lower part of said bracket at a level below the bight of said hook, and extending downwardly a substantial distance below the lowermost part of the hook and to the rear thereof, and a shock absorber carried by said skid mounting and operatively connected with the skid for resisting upward movement thereof, whereby the skid hits the landing surface before the hook hits such surface, said shock absorber absorbing the impact and preventing violent impact of the hook with the landing surface.

3. In combination with an airplane, an arresting hook carried by the airplane, adapted to engage a transverse cable on a landing surface, a skid pivoted to said hook and projecting a substantial distance below and rearwardly with respect to said hook, a shock absorber mounted on said hook and operatively connected to said skid for resisting upward movement thereof, whereby the skid hits the landing surface before the hook hits such surface, said shock absorber absorbing the impact and preventing violent impact of the hook with the landing surface.

4. In combination with an airplane, an arresting hook carried by the airplane, adapted to engage a transverse cable on a landing surface, a skid mounting bracket secured to the lower part of said hook, just aft of the hook, a skid pivoted to the lower part of said bracket at a level below the bight of said hook, and extending downwardly a substantial distance below the lowermost part of the hook and to the rear thereof, and a shock absorber carried by said skid mounting and operatively connected with the skid for resisting upward movement thereof, whereby the skid hits the landing surface before the hook hits such surface, said shock absorber absorbing the impact and preventing violent impact of the hook with the landing surface.

5. A shock-absorber assembly for airplane arresting hooks, comprising an arresting hook carried by the plane, a pair of laterally spaced plates carried by said hook, a shock absorber pivoted to said plates, a skid pivoted to said plates and projecting a substantial distance below and rearwardly with respect to said hook, means operatively connecting the skid and shock absorber, whereby the skid hits the landing surface before the hook hits such surface, the shock of such contact being taken up by said shock absorber.

References Cited in the file of this patent

UNITED STATES PATENTS

| | | |
|---|---|---|
| 1,159,720 | Simpson | Nov. 9, 1915 |
| 1,472,086 | Pierson et al. | Oct. 30, 1923 |
| 1,613,843 | Mummert et al. | Jan. 11, 1927 |
| 1,670,402 | Campbell | May 22, 1928 |
| 2,602,613 | Turner | July 8, 1952 |
| 2,696,957 | Brown | Dec. 14, 1954 |